(12) United States Patent
Holland

(10) Patent No.: US 11,271,463 B2
(45) Date of Patent: Mar. 8, 2022

(54) AXIAL FLUX PERMANENT MAGNET MOTOR

(71) Applicant: CSAW Studios LLC, Ypsilanti, MI (US)

(72) Inventor: Seanan R. Holland, Ypsilanti, MI (US)

(73) Assignee: CSAW STUDIOS L.L.C., Ypsilanti, MI (US)

( * ) Notice: Subject to any disclaimer, the term of this patent is extended or adjusted under 35 U.S.C. 154(b) by 0 days.

(21) Appl. No.: 17/072,476

(22) Filed: Oct. 16, 2020

(65) Prior Publication Data

US 2021/0119522 A1 Apr. 22, 2021

Related U.S. Application Data

(60) Provisional application No. 62/915,797, filed on Oct. 16, 2019.

(51) Int. Cl.
*H02K 21/24* (2006.01)
*H02K 1/18* (2006.01)
(Continued)

(52) U.S. Cl.
CPC .............. *H02K 21/24* (2013.01); *B63H 21/17* (2013.01); *B63H 23/06* (2013.01); *H02K 1/182* (2013.01);
(Continued)

(58) Field of Classification Search
CPC .......... H02K 21/24; H02K 1/18; H02K 5/124; H02K 5/132; H02K 7/08; H02K 7/116;
(Continued)

(56) References Cited

U.S. PATENT DOCUMENTS

| 5,801,473 A | 9/1998 | Helwig |
| 6,924,574 B2 | 8/2005 | Qu et al. |

(Continued)

FOREIGN PATENT DOCUMENTS

| EP | 2256909 A2 | 12/2010 |
| EP | 3263418 A1 | 1/2018 |

(Continued)

OTHER PUBLICATIONS

International Search Report and Written Opinion, Application No. PCT/US2020/055978 dated Feb. 4, 2021.

(Continued)

*Primary Examiner* — Naishadh N Desai
(74) *Attorney, Agent, or Firm* — The Dobrusin Law Firm, P.C.; Bryan S. Lemanski

(57) ABSTRACT

A motor comprising: (a) a stator having a plurality of ferrous cores surrounded by a plurality of windings; (b) a pair of rotors positioned on opposing sides of the stator, each rotor including a ring gear; and (c) a drive shaft extending through a cutout of the stator, the drive shaft having a pinion gear positioned near an end of the drive shaft in communication with the ring gears of the rotors; wherein the rotors rotate in opposing directions so that the ring gears translate a movement of the rotors to the drive shaft through the pinion gear to rotate the drive shaft in a direction substantially orthogonal to a direction of rotation of the rotors.

20 Claims, 9 Drawing Sheets

(51) Int. Cl.
  *H02K 5/124* (2006.01)
  *B63H 23/06* (2006.01)
  *H02K 7/08* (2006.01)
  *H02K 7/116* (2006.01)
  *B63H 21/17* (2006.01)
  *H02K 5/132* (2006.01)

(52) U.S. Cl.
  CPC ............ *H02K 5/124* (2013.01); *H02K 5/132* (2013.01); *H02K 7/088* (2013.01); *H02K 7/116* (2013.01)

(58) Field of Classification Search
  CPC .......... H02K 1/182; H02K 7/088; H02K 3/28; B63H 21/17; B63H 23/06
  See application file for complete search history.

(56) References Cited

U.S. PATENT DOCUMENTS

| | | | |
|---|---|---|---|
| 7,815,535 | B2 | 10/2010 | Ai et al. |
| 8,930,055 | B2 | 1/2015 | Yuan |
| 9,973,066 | B2 | 5/2018 | Tchervenkov et al. |
| 2010/0263959 | A1 | 10/2010 | Haas |
| 2014/0292131 | A1* | 10/2014 | Ramamoorthy ....... H02K 51/00 310/114 |
| 2018/0351441 | A1 | 12/2018 | Milheim |

FOREIGN PATENT DOCUMENTS

| | | | |
|---|---|---|---|
| WO | 2019/125347 A1 | 6/2019 | |
| WO | WO-2019125347 A1 * | 6/2019 | ............. H02K 16/02 |

OTHER PUBLICATIONS

Moreels, Daan and Leijnen, Peter, Article Title: High Efficiency Axial Flux Machines, Why Axial Flux Motor and Generator Technology Will Drive the Next Generation of Electric Machines, V1.9, Nov. 2018, 21 pages.

* cited by examiner

AXIAL FLUX PERMANENT MAGNET MOTOR

FIELD

The present teachings generally relate to a motor, and more particularly, to an axial flux motor having an orthogonally driven shaft.

BACKGROUND

Motors are frequently used in a variety of industries, including the automotive, marine, and aviation industries. While historically the aforementioned industries would use gasoline motors in their vehicles, recent trends have shown a significant increase in electric motors. Electric motors generally include one or more rotors and a stator, whereby the one or more rotors may move relative to the stator based on electrical excitation of the stator. The stator may create a magnetic field between the rotor and the stator that interacts and/or moves the one or more rotors. Electric motors typically require zero contact between a driveshaft connected to the motor and the motor itself, resulting in generally a simpler design with fewer moving parts, and a motor that does not generate heat and/or friction like a fuel-powered motor. Additionally, electric motors may be more environmentally friendly when compared to gasoline motors due to the electric motors not requiring burning of a fuel. Moreover, electric motors may also provide increased power and/or improved packaging over fuel-powered motors, such as gasoline motors, diesel motors, propane motors, compressed natural gas (CNG) motors, or a combination thereof.

While electric motors have significantly increased in the automotive and marine industries in recent years, the current designs of electric motors may be difficult to incorporate into current packaging requirements for certain vehicles, may present disadvantages such as drag, or both. For example, many sailboats have maintained an overall design structure for decades. Because the sailboat designs may not have contemplated electric motors initially, retrofitting of the sailboats may be required, which may present disadvantages, such as inefficient positioning of the motor, structural degradation to the hull due to modifications, or both. As a result, current sailboat motors may be positioned around one or more portions of the hull, a cockpit within the hull, a cabin of the sailboat, or a combination thereof. The undesirable packaging of the motor may often result in an inefficient transfer of movement from the motor to one or more rudders of the sailboat, thereby requiring more energy output from the motor and/or increasing strain on the motor. Additionally, the undesirable packaging of the motor may result in inefficient use of space due to limited mounting locations of the motor.

It would be attractive to have an electric motor that may be easily packaged within the constraints of a sailboat hull, hull appendage, or both. What it needed is an electric motor having a smaller footprint. It would be attractive to have an electric motor with increased efficiency and power. What is needed is an axial flux motor that may be mounted at any desired angle relative to a driveshaft, propeller of a boat, or both to improve overall performance and movement of the motor. It would be attractive to have a tunable electric motor based on a desired vehicle. What is needed is an electric motor having adjustable ring gear sizes to adjust torque of the motor, a rotational speed of the motor, or both.

SUMMARY

The present teachings meet one or more of the present needs by providing a motor comprising: (a) a stator having a plurality of ferrous cores surrounded by a plurality of windings; (b) a pair of rotors positioned on opposing sides of the stator, each rotor including a ring gear; and (c) a drive shaft extending through a cutout of the stator, the drive shaft having a pinion gear positioned near an end of the drive shaft in communication with the ring gears of the rotors; wherein the rotors rotate in opposing directions so that the ring gears translate a movement of the rotors to the drive shaft through the pinion gear to rotate the drive shaft in a direction substantially orthogonal to a direction of rotation of the rotors.

The present teachings meet one or more of the present needs by providing a motor, wherein: the plurality of ferrous cores are positioned along a periphery of the stator and the plurality of windings determine a polarity of each ferrous core the plurality of windings is wound upon; the plurality of windings is a continuous line that wraps around all of the plurality of ferrous cores; the pair of rotors each include a plurality of magnets so that, when electricity flows through the plurality of windings, an axial flux extending between the pair of rotors and the stator initiates rotation of the pair of rotors; the ring gears are positioned within a recess of each of the rotors and surround an aperture of the rotor; the drive shaft extends through a cutout of the stator so that the pinion gear is positioned within an aperture of the stator to communicate with the ring gears of the rotors; the drive shaft is secured within the cutout by a bearing block, and the drive shaft rotates within the bearing block by a plurality of bearings secured around the drive shaft and secured by a plurality of locking collars; the stator and the pair of rotors are housed within a casing, and the drive shaft extends through a hole of the casing to communicate with the stator and the pair of rotors; a seal surrounds the drive shaft extending through the casing to prevent moisture, debris, or both from entering the casing, oil from exiting the casing, or a combination thereof; the pair of rotors rotate about a motor shaft extending through apertures of the pair of rotors and the stator; the pair of rotors rotate about the motor shaft via a plurality of bearings spaced apart by one or more washers, a spacer, or both; the casing is disk-shaped; the motor is a boat motor; the ring gears of the rotors sandwich the pinion gear of the drive shaft; the motor is configured to fully operate when fully submerged in water; the stator remains stationary during operation of the motor; the ring gears extend into the aperture of the stator to engage the pinion gear so that the pair of rotors and the stator are substantially coaxial; the magnets of each rotor alternate in polarity; the stator is secured to a casing ring of the casing by a plurality of fasteners extending through through-holes of the casing ring into the stator; the polarity of the plurality of windings around each core is dictated by winding each of the plurality of windings in a clockwise or a counterclockwise direction; the motor is a single-phase motor or a 3-phase motor; or a combination thereof.

The present teachings meet one or more of the present needs by providing: an electric motor that may be easily packaged within the constraints of a sailboat hull, hull appendage, or both; an electric motor having a smaller footprint; an electric motor with increased efficiency and power; an axial flux motor that may be mounted at any desired angle relative to a driveshaft, propeller of a boat, or both to improve overall performance and movement of the motor; a tunable electric motor based on a desired vehicle; an electric motor having adjustable ring gear sizes to adjust torque of the motor, a rotational speed of the motor, or both; or a combination thereof.

DETAILED DESCRIPTION

Figure 1:
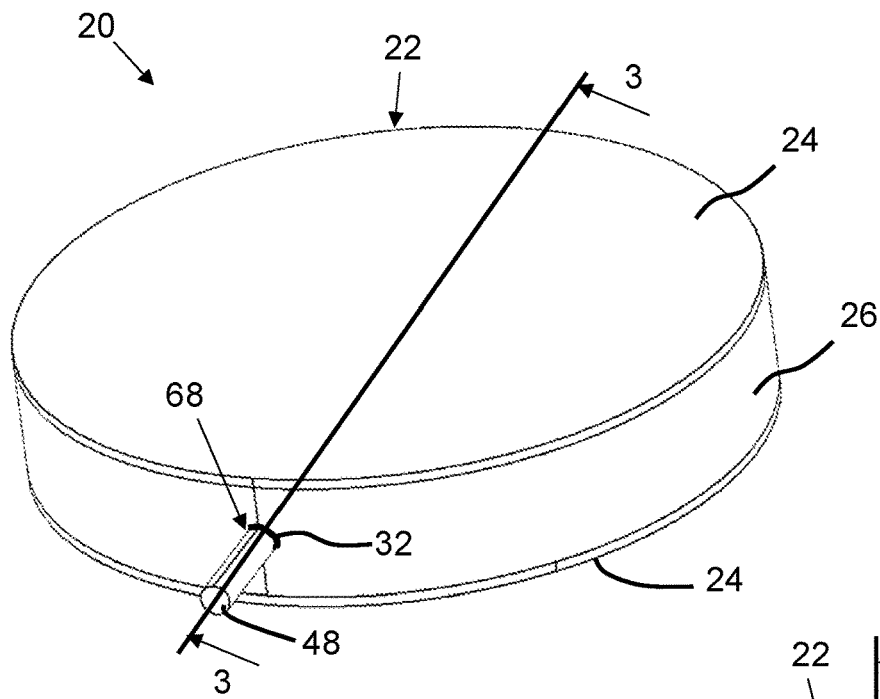
FIG. 1 is a perspective view of a motor in accordance with the present teachings.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings generally relate to a motor. The motor may function to power one or more vehicles, one or more pieces of equipment, or both. The motor may function to convert electrical energy into mechanical energy to propel a vehicle, such as an automotive vehicle, boat, aircraft, or a combination thereof. It is contemplated that the motor may be configured for any industry, such as automotive, marine, aerospace, agriculture (e.g., tractors), household appliance, other industries, or a combination thereof. The motor may function to generate torque. The motor may be an electric motor. As such, it is contemplated that the motor may be free of any combustion chamber and may not require any fuel to generate energy within the motor. The motor may be a DC motor. The motor may be an AC motor. The motor may be a brush motor. The motor may be a brushless motor. The motor may be a series-wound motor, a shunt wound motor, a compound wound motor, a permanent magnet motor, or a combination thereof. The motor may be controlled by one or more control units. For example, a motor control unit (MCU) may power on and/or power off the motor, determine a power output and/or movement of the motor, or a combination thereof.

The motor may be configured to transfer a generated torque to one or more portions of one or more pieces of equipment. The motor may be configured to generate torque that may translate to a movement of one or more vehicles. The one or more vehicles may be a plane, boat, automotive vehicle, or a combination thereof. The motor may be environmentally friendly. For example, the motor may run on electricity free of any secondary fuels (e.g., fossil fuels such as conventional gasoline). The motor may be a 3-phase motor or may be a single-phase motor. The motor may translate a generated torque in one or more desired directions. For example, the motor may generate a torque on a drive shaft of the motor to rotate the drive shaft. The drive shaft may extend substantially coaxial with an axis of rotation of one or more rotors of the motor. The drive shaft may extend along an axis other than coaxial with an axis of rotation of the motor. For example, the motor may generate a torque along a drive shaft that is substantially orthogonal (i.e., substantially perpendicular) to an axis of rotation of one or more rotors of the motor.

The motor may include a casing. The casing may function to protect the motor from outside contamination. The casing may function to prevent moisture, debris, or both from entering the casing and contacting one or more components of the motor. The casing may be hermetically sealed. The casing may be shaped substantially similar to a shape of one or more rotors of the motor, a stator of the motor, or both. The casing may be waterproof, water-resistant, or both. The casing may be monolithically (i.e., integrally) formed to encompass the motor. The casing may include one or more openings, one or more doors, one or more access panels, or a combination thereof. As such, it is contemplated that an operator and/or mechanic of the motor may access components of the motor via an opening, door, access panel, or a combination thereof. The casing may substantially enclose all or a portion of the motor. For example, the casing may enclose substantially all of the inner workings of the motor except for a drive shaft that may extend through the casing to translate a generated torque to one or more outside items. The casing may be any desired size and shape. The casing may be substantially cubicle, disc-shaped, box-shaped, any other shape, or a combination thereof.

The casing may include a case ring. The case ring may function to form a housing of the casing. The case ring may function to protect the motor from outside contamination, debris, moisture, or a combination thereof. The case ring may substantially encompass the motor. The case ring may extend substantially around an outer periphery of the motor. For example, the case ring may extend around the entire outer periphery of the motor and include one or more openings to receive one or more portions of the motor. The case ring may be structurally rigid. The case ring may be any desired size and shape. The case ring may be made from any desired material. However, it is contemplated that the case ring may be moisture-resistant, corrosion-resistant, or both. For example, the case ring may be protected by one or more coatings to prevent degradation of the case ring from contact with moisture, debris, or both.

The case ring may include one or more through-holes. The through-holes may function to receive one or more fasteners. The fasteners may extend through the through-holes of the case ring to secure one or more components to the case ring. For example, a plurality of fasteners may extend through the through-holes to secure a stator of the motor within the confines of the case ring. The throughholes may be any desired size and/or shape. The throughholes may be shaped to receive any desired fastener. The fasteners may be a bolt, screw, nail, stud, setscrew, pin, key, or a combination thereof. The fasteners may be threaded or free of threading.

The case ring may include a drive shaft hole. The drive shaft hole may function to receive the drive shaft of the motor so that the drive shaft may extend out of the casing. The drive shaft hole may be shaped substantially similar to an outer surface of the drive shaft. The drive shaft hole may be positioned anywhere along the case ring. The drive shaft hole may extend through a thickness of the case ring. The drive shaft hole may include one or more chamfered edges, one or more rounded edges, or both. The drive shaft hole may be tapered or may be free of tapering. The drive shaft hole may include one or more abrasive surfaces or may have substantially smooth surfaces. For example, an inner surface of the drive shaft hole may be substantially smooth to promote movement of the drive shaft within the drive shaft hole and prevent locking of the drive shaft when contacting the case ring.

A seal may be positioned within the drive shaft hole. The seal may function to prevent moisture, debris, or both from entering the casing through the drive shaft hole. The seal may function to prevent a lubricant from exiting the casing. For example, the drive shaft may include a lubricant disposed on one or more surfaces to prevent friction during movement of the drive shaft. The seal may prevent the lubricant from exiting the drive shaft hole and maintain a substantially frictionless movement of the drive shaft within the casing. The seal may be shaped to substantially or entirely fill a gap between the drive shaft and the drive shaft hole. The seal may be compressible to create a press-fit condition with the drive shaft, the drive shaft hole, or both. The seal may be integrally formed with the case ring. The seal may be secured to the case ring. The seal may be an O-ring, a foamable material, an adhesive material, a flexible material, or a combination thereof. The seal may be a substantially rigid material mounted to the casing around the drive shaft hole.

One or more case disks may be secured to the case ring. The case disks may function to connect to the case ring and form the casing. The case disks may function as access panels to one or more components of the motor. The case disks may be secured to peripheral edges of the case ring. The case disks may form a seal with the case disks to prevent moisture, debris, or both from entering the casing. If a gap is present between the case disks and the case ring upon assembly, a sealant may be disposed between the case disk and the case rings. The sealant may be a liquid sealant, adhesive, foamable material, compressible material, or a combination thereof. The case disks may be coextensive with the case ring. The case disks may extend beyond a terminal edge of the case ring. The case disks may be recessed from a terminal edge of the case ring. The case disks may include a flange. The case disks may include one or more arcuate portions, one or more linear segments, one or more flat surfaces, one or more undulating surfaces, one or more lips, one or more bends, or a combination thereof. The case disks may include latches, fingers, clasps, hooks, arms, or a combination thereof to secure the case disks to the case ring. The case disks may be secured to the case ring via one or more fasteners, one or more adhesives, one or more sealants, or a combination thereof. For example, the case disks may be secured to a peripheral edge of the case ring by a plurality of fasteners. The plurality of fasteners may be received by mounting holes in the case disk.

The mounting holes may function to receive one or more fasteners. The mounting holes may secure the fasteners so that the case disks are secured to the case ring. The mounting holes may be positioned anywhere along the case disk. The mounting holes may be positioned along one or more peripheral edges of the case ring. The mounting holes may be a bore hole along a surface of the case ring. The mounting holes may extend through a thickness of the case ring or may only extend through a portion of a thickness of the case ring. The mounting holes may be a plurality of mounting holes around a periphery of the case ring. The mounting holes may include a threading that mates to a threading of one or more fasteners being received by the mounting holes.

The motor may include a stator. The stator may function to move a drive shaft of the motor. The stator may function to move one or more rotors. The stator may include one or more magnets, one or more windings, one or more cores, or a combination thereof. The stator may assist in moving the drive shaft of the motor or may be free of direct communication with the drive shaft. The stator may indirectly communicate with the drive shaft. For example, the stator may move one or more rotors and the one or more rotors may directly communicate with the drive shaft to move the drive shaft. The stator may be free of direct contact with one or more rotors, a drive shaft, or both. The rotor may be mounted to the housing. The rotor may be adjacent to one or more rotors. For example, a pair of rotors may be positioned near opposing surfaces of the stator so that the rotors substantially "sandwich" the stator. The rotors and the stator may communicate in a contactless manner. Contactless manner may mean that the stator may move the rotors without physically touching the rotors. The stator may remain substantially stationary during operation of the motor.

The stator may be substantially rigid. The stator may be free of deflection or displacement during operation of the motor. The stator may be structurally solid. For example, the stator may be substantially formed of a solid piece of material. The stator may be made from one or more polymers, one or more metals, or a combination thereof. It is contemplated that the stator may be made from one or more metals, such as aluminum, iron, steel, copper, tungsten, zinc, or a combination thereof. Alternatively, or additionally, the stator may be made from one or more polymers, one or more composite materials, one or more resins, or a combination thereof. The stator may be any desired size and shape. The stator may be shaped substantially similar to the casing, to the one or more stators, or both. For example, the stator may be substantially disk-shaped so that the stator may be housed within a substantially disk-shaped casing. The stator may include one or more hollow portions, one or more holes, one or more cutouts, or a combination thereof.

The stator may include an aperture. The aperture may function to receive one or more components of the motor. The aperture may provide a substantially open space to allow one or more components of the motor to freely move. For example, a portion of the drive shaft may be positioned within the aperture to communicate with one or more rotors so that the drive shaft may rotate within the aperture. The aperture may receive a portion of a motor shaft to align the stator with one or more rotors. The aperture may receive a portion of the one or more rotors, such as one or more gears, one or more projections, one or more flanges, or a combination thereof. The stator and the aperture may be substantially concentric around an axis of the stator. The aperture may be centrally located along the stator. The aperture may be fully enclosed by the stator on one or more sides. The aperture may extend through a thickness of the stator.

The aperture may be connected to a cutout of the stator. The cutout may function to provide a channel between one or more peripheral edges of the stator and the aperture. The cutout may be a channel along a portion of the stator. The cutout may have any desired width. The width may be measured between opposing interior walls of the cutout. The cutout may extend between the aperture and an outer surface of the stator. The cutout may receive a portion of the drive shaft. For example, the drive shaft may extend into the aperture through the cutout so that a portion of the drive shaft may extend out of the casing and drive one or more components of a vehicle. The cutout may be any desired size and shape. The cutout may be U-shaped, V-shaped, C-shaped, D-shaped, O-shaped, or a combination thereof. The cutout may form a channel substantially free from any encumbrances. For example, the cutout may be free of any components of the stator, such as one or more windings, one or more cores, or both. Therefore, it is contemplated that the stator may have a void within the cutout so that the stator may be asymmetrical, yet the stator may still operate without a decrease in performance (e.g., torque, power, speed, etc.).

The stator may include one or more cores. The cores may function to at least partially aid in moving one or more rotors. The cores may function to position one or more windings of the stator. The cores may communicate with the one or more rotors to help move the one or more rotors. The cores may be electrically charged to help create a flux between the stator and the one or more rotors. The flux may extend radially relative to the stator or may extend axially relative to the stator. For example, the flux created by a magnetic field between the stator and one or more rotors may extend between a surface of the one or more rotors and the stator, and the flux may be substantially parallel to an axis of rotation of the one or more rotors. The cores may be polarized. The cores may have a polarity that opposes a polarity of one or more portions of a rotor to repulse a portion of the rotor and promote movement of the rotor. The cores may have a polarity that is the same as a polarity of one or more portions of a rotor. The stator may have a plurality of cores each having a desired polarity. For example, the cores may alternate polarity around a circumference of the stator, may have similar polarities, or a combination thereof. The cores may be unpolarized. For example, the cores may be unpolarized and may only be polarized based on one or more windings around the cores being electrically charged. The cores may extend through a thickness of the stator. The cores may be positioned anywhere along the stator. The stator may include about 2 or more cores, about 10 or more cores, or about 20 or more cores. The stator may include about 50 or less cores, about 30 or less cores, or about 25 or less cores. The stator may include a number of cores that is substantially equal to a number of magnets in the rotors, less than a number of magnets in the rotors, or greater than a number of magnets in the rotors.

The cores may be any material that may hold a charge. It is contemplated that the cores may be a metallic material that may be electrically excited and may be electrically conductive. The cores may be aluminum, steel, brass, copper, iron, nickel, cobalt, magnetite, samarium, neodymium, barium, bismuth, or a combination thereof. The cores may be a ferromagnetic material. The cores may be a ferrous material.

The cores may be any size and shape. The cores may be a plug within the stator. The cores may be a rod, pole, cylinder, sphere, or a combination thereof. The cores may be conical. The cores may include one or more tapered edges. The cores may include one or more smooth surfaces, one or more abrasive surfaces, or both. The cores may include one or more flanges, one or more arcuate portions, one or more linear segments, one or more planar portions, or a combination thereof. The cores may be secured within the stator by one or more fasteners, one or more adhesives, or a combination thereof. The cores may be secured within the stator using a press-fit condition. The cores may be compressible. The cores may be rigid.

The cores may be surrounded by a winding. The winding may function to carry an electrical current. The winding may function to excite the cores and dictate a polarity of the cores. The polarity of the cores may be dictated by a winding direction. For example, a first core may have a first polarity based on a clockwise winding direction around the first core while a second core may have a second opposing polarity based on a counterclockwise winding direction around the second core. It is contemplated that the windings around a plurality of cores may be created by a single wire. For example, the windings around a plurality of cores may be a single continuous wire that connects the windings around each core. Thus, the stator may be substantially simplified to eliminate the need for multiple separate windings. As a result, the stator may not require a specific programming to ensure that each winding is electrically charged at a desired time in order to prevent cogging and/or stalling of the motor. Therefore, it is contemplated that a single wire may be electrically charged and may not require any staggering of charges, programming of electrical output, or both. The winding may be any electrically conductive material. The windings may be copper, brass, iron, steel, aluminum, bronze, zinc, or a combination thereof. The windings may be a plurality of separate, interconnected windings. For example, the windings may be separate wire segments in electrical communication with one another.

The winding may be in direct contact with the cores. The windings may be free of direct contact with the cores. The windings may be positioned within one or more cavities of the stator. The winding may be secured to one or more outer surfaces of the stator, inner surfaces of the stator, or both. The winding may be free of contact with the one or more rotors. The winding may be positioned so that the winding is free of contact with any moving components of the motor.

The winding may include any desired number of coils. A coil may be a loop of the winding around the cores. It is contemplated that while the winding may be a continuous wire, the winding may be at least partially wrapped around one or more of the cores. The winding may be wrapped around the one or more cores to include about one or more loops, about 50 or more loops, about 250 or more loops, or about 500 or more loops. The winding may be wrapped around the one or more cores to include about 1,000 or less loops, about 750 or less loops, or about 600 or less loops. Each core may include the same number of loops of the winding. The cores may include a different number of loops of the winding. For example, a portion of the cores may have about 10 or more loops of the winding while another portion of the cores may have less than 10 loops of the winding. As such, the cores may have any number of coils (i.e., loops) of the winding at least partially encompassing the cores.

The windings may form one or more series within the stator. For example, a first series of cores may be at least partially surrounded by windings from a first wire while a second series of cores may be at least partially surrounded by windings from a second wire. The first wire and the second wire may electrically excite the first series of cores and the second series of cores, respectively, simultaneously. Alternatively, the first series of cores and the second series of cores may have different excitation timing. For example, both the first series of cores and the second series of cores may initially be simultaneously electrified during a ramp-up period of the motor requiring an increased power draw. Once the motor reaches a point beyond the ramp-up period (i.e., when the motor is maintaining a constant power draw for operation), the first series of cores or the second series of cores may be deactivated, yet the motor may maintain its power. As such, it is contemplated that the motor may include any desired number of series and timing of activation and/or deactivation of each series may be adjusted based on a desired application.

The windings may communicate with one or more rotors of the motor. The rotors may function to create a torque of the motor. The rotors may function to translate a torque of the motor into mechanical movement along one or more portions of the motor. The rotors may be in communication with the stator, the drive shaft, a motor shaft, or a combination thereof. The rotors may move relative to the stator. For example, the stator may remain stationary while the rotors rotate about an axis of the stator, the rotor, or both. The rotors may be concentric. The rotors and the stator may be concentric. The rotors may rotate in a desired direction around an axis of rotation. The rotors may rotate counter-clockwise around the axis of rotation, clockwise around the axis of rotation, or both. The rotors may be free of contact with the stator. The rotors may be positioned near one or more surfaces of the stator. The rotors may be positioned anywhere relative to the stator. The rotors may be positioned to create a desired gap between the rotors and the stator. The gap may be about 0.1 mm or more, about 1 mm or more, about 5 mm or more, or about 10 mm or more. The gap may be about 30 mm or less, about 20 mm or less, or about 15 mm or less. It is contemplated that the rotors may be positioned substantially close to the stator to minimize packaging of the motor. The rotors may be a single rotor or may be a plurality of rotors. The motor may include one or more rotors, two or more rotors, or three or more rotors. The motor may include six or less rotors, five or less rotors, or four or less rotors. For example, the motor may include a pair of opposing rotors that "sandwich" the stator by being positioned on opposing sides of the stator. The opposing rotors may rotate in a same direction or a different direction relative to each other.

The rotors may include one or more magnets. The magnets may function to communicate with the stator to create a magnetic field (and thus a flux) between the rotors and the stator. The magnets may be free of contact with the stator. The magnets may be polarized so that, when the stator is electrically charged, the magnets are attracted and/or repulsed by the stator, thereby creating a rotational movement of the rotors. The magnets may be polarized with any desired polarity. For example, the magnets may have alternating polarity around a circumference of the rotors, may have similar polarity, or a combination thereof. The magnets may be positioned anywhere along the rotors. The magnets may be secured within one or more hollow portions of the rotors. The magnets may be secured to the rotors by one or more fasteners, one or more adhesives, or both. A surface of the magnets may be substantially flush with a surface of the rotors. The rotors may include one or more magnets, five or more magnets, or ten or more magnets. The rotors may include 50 or less magnets, 30 or less magnets, or 25 or less magnets. The magnets may be positioned near a peripheral edge of the rotors. The magnets may be evenly distributed around a circumference of the rotors. The magnets may be any magnetic material. The magnets may be a ferromagnetic material. The magnets may be iron, neodymium iron boron (NdFeB), samarium cobalt (SmCo), alnico, ceramic, another ferrite magnet, or a combination thereof.

The rotors may include an aperture. The aperture may function to receive one or more components of the motor. The aperture may provide a substantially open space to allow one or more components of the motor to freely move. For example, a portion of a motor shaft may be positioned within the aperture so that the rotors and the stator are substantially coaxial. The aperture may receive a portion of a drive shaft so that the rotors may mechanically rotate the drive shaft. The aperture may be centrally located along the rotors. The aperture may be fully enclosed by the rotors on one or more sides. The aperture may extend through a thickness of the rotors. One or more of the rotors may be free of an aperture. Each rotor may include an aperture. The apertures of each rotor may be substantially similar or may be nonuniform. The apertures of the rotors may position the rotors around a motor shaft so that the rotors may be free to rotate around the motor shaft.

The aperture may be at least partially surrounded by a recess of the rotors. The recess may function to receive one or more components secured to the rotors. The recess may secure a ring gear around the motor shaft. The recess may be a notch, step, carved out portion of the rotors, or a combination thereof. A surface of the recess may be substantially parallel to one or more outer surfaces of the rotors. The recess may be recessed any desired distance from one or more surfaces of the rotors. The rotors may include a recess on one or more surfaces. For example, opposing surfaces of the rotors may each include a recess so that the rotors may be used on any desired side of the stator (i.e., the rotors may not need to be designated as a left-hand rotor or a right-hand rotor). The recess may entirely surround an aperture of the rotors. The recess may extend along a peripheral edge of the aperture.

The recess may receive a ring gear. The ring gear may function to communicate with the drive shaft. The ring gear may translate a rotational movement of a rotor into rotational movement of the drive shaft. The ring gear may substantially follow a shape of the recess. The ring gear may at least partially surround the aperture of the rotors. The ring gear may project from a surface of the rotors. The ring gear may include one or more teeth. The ring gears may include any desired number of teeth. The teeth may be any desired height, spacing, or both. The ring gear may have any desired size and shape. It is contemplated that a diameter of the ring gear may be changed to adjust a torque of the motor, a rotational speed (e.g., revolutions-per-minute (RPM)) of the motor, or both. Thus, the motor may be customizable to meet the desired demands of any desired vehicle. For example, a ring gear with a larger diameter may be used for a vehicle requiring lower torque and increased RPM's. Alternatively, a ring gear with a smaller diameter may be used for a vehicle requiring higher torque and decreased RPM's. The recess and/or one or more surfaces of the rotors may include sufficient surface space so that one or more different ring gears having different configurations may be interchangeable. As such, the ring gears may be removable from the stator so that the ring gears may be interchangeable free of damage of the ring gears, the rotors, or both. The ring gears may not be positioned within a recess of the rotors. For example, the ring gears may be secured to a surface of the rotors and be free of contact with a recess.

The ring gear may mechanically rotate the drive shaft. The drive shaft may function to receive a translated rotational movement from the stators to move one or more vehicles, one or more items, or a combination thereof. The drive shaft may drive a vehicle. The vehicle may be driven by moving one or more components of the vehicle that in turn move the vehicle. For example, the drive shaft may drive one or more propellers of a boat to propel the boat through water. The drive shaft may mechanically communicate with the ring gear of a rotor. The drive shaft may communicate with the rotors to translate a direction of rotation of the rotors. For example, the rotors may rotate around a first axis of rotation, and the movement of the rotors may be translated to the drive shaft so that the drive shaft may rotate around an axis of rotation that is substantially orthogonal (i.e., approximately 90 degrees) to the axis of rotation of the rotors. The drive shaft may translate the rotation of the rotors at an angle other than substantially orthogonal to the axis of rotation of the rotors. The angle of translation may be about 30 degrees or more, about 60 degrees or more, or about 90 degrees or more. The angle of translation may be about 180 degrees or less, about 150 degrees or less, or about 120 degrees or less. The drive shaft may translate all or most of the movement of the rotors. The drive shaft may translate about 100% or less, about 90% or less, or about 80% less of the movement of the rotors. The drive shaft may translate about 50% or more, about 60% or more, or about 70% or more of the movement of the rotors. It is contemplated that the drive shaft may translate a movement of the rotors in a highly efficient manner (i.e., about 100% of the movement).

The drive shaft may be positioned anywhere within the motor to communicate with the rotors. A plurality of rotors may communicate with the drive shaft to rotate the drive shaft. For example, opposing rotors positioned on opposing sides of the drive shaft and the stator may rotate in opposing directions so that the movement of both rotors work in conjunction with one another to rotate the drive shaft. As such, the drive shaft may rotate at a higher speed as a result of multiple rotors acting on the drive shaft. The drive shaft may extend through one or more portions of the stator. The drive shaft may at least partially extend through a cutout of the stator. A portion of the drive shaft may be positioned within the aperture of the stator to abut ring gears of the rotors that may also be positioned at least partially within the aperture of the stator.

A pinion gear of the drive shaft may directly communicate with the ring gears of the rotors. The pinion gear may function to orthogonally translate a movement of the rotors to rotate the drive shaft. The pinion gear may include a plurality of teeth that intermingle with teeth of the ring gears. The pinion gear may be positioned near a terminal end of the drive shaft. The pinion gear may be positioned within the aperture of the stator. The pinion gear may be any desired size and shape to interact with various ring gear sizes. The pinion gear may be customizable and/or replaceable. For example, the pinion gear may be threaded onto an end of the drive shaft so that, when a ring gear is replaced or changed out for a different sized ring gear, a corresponding pinion gear may also be interchanged. Alternatively, the pinion gear may be monolithically formed with the drive shaft. The teeth of the ring gears may apply a force to the teeth of the pinion gear to rotate the pinion gear, and thereby rotate the drive shaft. A diameter of the pinion gear may be less than a diameter of the ring gears, may be greater than a diameter of the ring gears, or both. The pinion gear may help rotate the drive shaft so that the drive shaft rotates within a bearing block of the motor.

The bearing block may function to secure the drive shaft in a movable manner so that the drive shaft may freely rotate. The bearing block may function to prevent movement of the drive shaft other than a rotational movement of the drive shaft around a longitudinal axis of the drive shaft (i.e., an axis extending through a length of the drive shaft). The bearing block may allow the drive shaft to rotate substantially free of any encumbrances, such as frictional forces. The bearing block may include one or more bore holes to receive a portion of the drive shaft. For example, the drive shaft may extend through the bearing block so that the bearing block supports a portion of the drive shaft. The bearing block may be positioned anywhere within the motor to secure the drive shaft in a desired position. The bearing block may be positioned within the cutout of the stator. The bearing block may have a height that is substantially similar to a width of the cutout so that the bearing block fits with the cutout in a secured manner substantially free of voids and/or crevices between the bearing block and the cutout. The bearing block may be any desired size and shape to support and/or receive a portion of the drive shaft. For example, the bearing block may have a length substantially similar to a length of the cutout of the stator. The bearing block may be coextensive with the cutout. The bearing block may be recessed from one or more terminal ends of the cutout. The bearing block may be mounted so that the bearing block remains stationary while the drive shaft rotates. The bearing block may thus prevent vertical movement, lateral movement, movement along an axis of the drive shaft, or a combination thereof of the drive shaft. The bearing block may be secured within the cutout by one or more fasteners, one or more adhesives, or both. The bearing block may be secured within the cutout free of any fasteners, adhesives, or both (i.e., a press-fit condition). The bearing block may include threading or may be free of threading.

The bearing block may contain one or more drive shaft bearings. The drive shaft bearings may function to substantially eliminate friction between the drive shaft and the bearing block. The drive shaft bearings may function to promote rotational movement of the drive shaft. The drive shaft bearings may be positioned anywhere within the bearing block. The drive shaft bearings may be in direct contact with the drive shaft. The drive shaft bearing may encompass a portion of the drive shaft. The drive shaft bearings may be an axial bearing, a thrust bearing, or a combination thereof. The drive shaft bearings may be a plurality of bearings or may be a single bearing. The drive shaft bearings may be positionally secured within the bearing block. The drive shaft bearings may be entirely contained within the bearing block so that the bearing block prevents debris, moisture, or both from contacting the drive shaft bearings. The drive shaft bearings may include one or more lubricants to promote movement of the drive shaft bearings, rotation of the drive shaft, or both. The drive shaft bearings may allow axial movement of the drive shaft so that the drive shaft may be easily inserted and/or removed from the bearing block.

The drive shaft may be positionally secured within the bearing block by one or more locking collars. The locking collars may function to lock the drive shaft axially in place. The locking collars may prevent axial movement, vertical movement, lateral movement, or a combination thereof of the drive shaft while allowing the drive shaft to rotate about an axis of rotation. The locking collars may include a hole so that the drive shaft extends through the locking collars. The locking collars may include one or more holes. The one or more holes may receive one or more fasteners (e.g., a pin, screw, bolt, or a combination thereof) to secure the locking collar in place. The locking collars may rotate simultaneously with the drive shaft. Alternatively, the locking collars may remain stationary while the drive shaft rotates. The locking collars may be positioned within the bearing block, may be located outside of the bearing block, or both. The locking collars may be positioned within the casing, outside the casing, or both. The locking collars may be a single locking collar or a plurality of locking collars. For example, a pair of locking collars may be positioned on opposing ends of the bearing block to secure the drive shaft in place.

The motor may include a motor shaft. The motor shaft may function to align the stator and the rotors. The motor shaft may secure the rotors, the stator, or both within the casing. The motor shaft may extend through an aperture of the stator, an aperture of the rotors, or both. The rotors may rotate about an axis of the motor shaft. The motor shaft may have a diameter substantially similar to a diameter of the aperture of the stator, the aperture of the rotors, or both. The motor shaft may have a diameter less than a diameter of the aperture of the stator, the aperture of the rotors, or both. The motor shaft may extend substantially perpendicular to the drive shaft. The motor shaft may extend substantially parallel to the drive shaft. The motor shaft and the drive shaft may form any desired angle.

The motor shaft may include a motor shaft bearing. The motor shaft bearing may function to allow the rotors to rotate around the motor shaft. The motor shaft bearing may function to allow movement of the motor shaft. The motor shaft bearing may be an axial bearing, a thrust bearing, or both. The motor shaft bearing may be positioned around an outer surface of the motor shaft. The motor shaft bearing may be positioned within an aperture of the rotors, an aperture of the stator, or both. The motor shaft bearing may be a plurality of bearings. For example, each rotor may include a motor shaft bearing positioned within an aperture to communicate with the motor shaft so that the rotors may freely rotate relative to the motor shaft.

One or more spacers may be positioned along the motor shaft. The spacers may function to position the rotors relative to each other, the stator, or both. The spacers may be substantially ring-shaped. The spacers may be at least partially positioned within apertures of the rotors, an aperture of the stator, or both. The spacers may include one or more flanges. The spacers may be any desired size and shape to create a desired spacing between the rotors and the stator. The spacers may be compressible or may be structurally rigid. The spacers may maintain a position of the one or more motor shaft bearings along the motor shaft.

The spacers, the motor shaft bearings, or both may abut one or more washers. The washers may function to fill a gap between the spacers and the motor shaft bearings. The washers may function to maintain a position of the spacers along the motor shaft. The washers may function to maintain a position of the motor shaft bearings along the motor shaft. The washers may be a ring washer. The washers may be any desired size and shape. The washers may have any desired thickness. The washer may abut a portion of the casing. For example, the washers may abut an inner surface of the case disks to create a tight fit within the casing.

Turning now to the figures, FIG. 1 illustrates a perspective view of a motor 20. The motor 20 includes a casing 22. The casing 22 includes a case ring 26 and two opposing case disks 24 secured to opposing ends of the case ring 26. A drive shaft 48 extends out of a drive shaft hole 68 of the case ring 26 and is configured to rotate based on articulation of the motor 20 (see FIGS. 3 and 4). The drive shaft 48 is surrounded by a seal 32 secured to the case ring 26 to prevent moisture, debris, or both from entering the casing 22. The seal 32 may also prevent lubricant, moisture, or both from exiting the casing 22.

Figure 2:
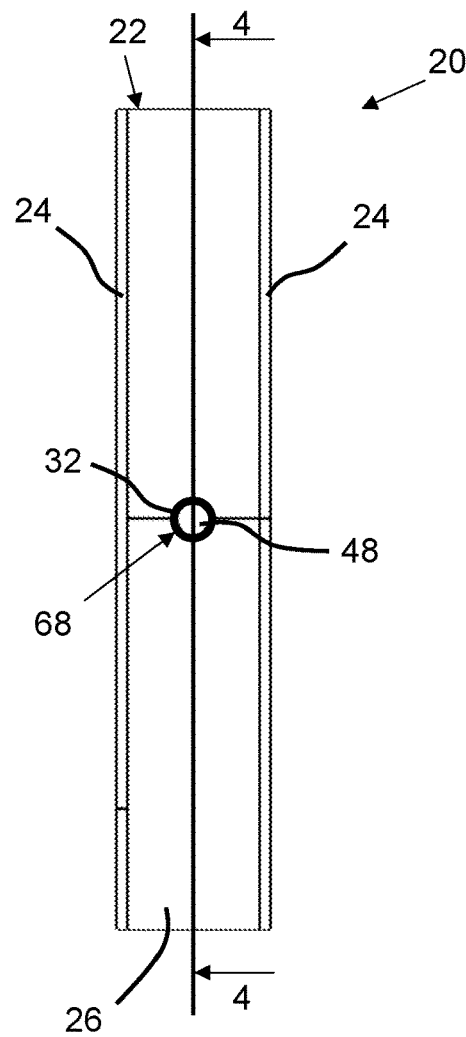
FIG. 2 is a side view of a motor in accordance with the present teachings.

FIG. 2 illustrates a side view of a motor 20. The motor 20 includes a casing 22. The casing 22 includes a case ring 26 and two opposing case disks 24 secured to opposing ends of the case ring 26. A drive shaft 48 extends out of a drive shaft hole 68 of the case ring 26 and is configured to rotate based on articulation of the motor 20 (see FIGS. 3 and 4). The drive shaft 48 is surrounded by a seal 32 secured to the case ring 26 to prevent moisture, debris, or both from entering the casing 22. The seal 32 may also prevent lubricant from exiting the casing 22.

Figure 3:
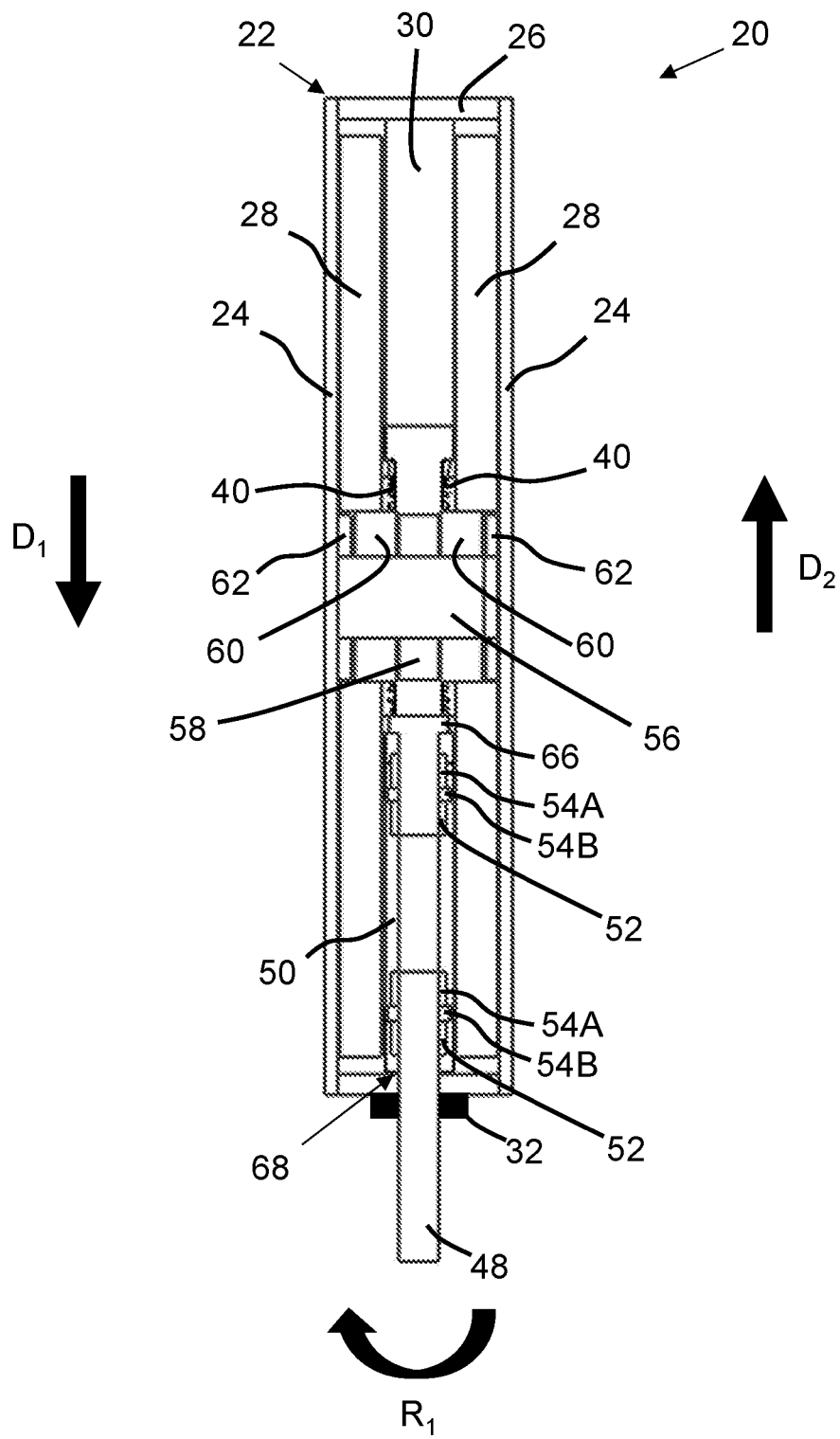
FIG. 3 is cross-section 3-3 of FIG. 1.

FIG. 3 is cross-section 3-3 of the motor 20 of FIG. 1. The motor 20 includes a casing 22. The casing 22 includes a case ring 26 and two opposing case disks 24 secured to opposing ends of the case ring 26. A drive shaft 48 extends out of a drive shaft hole 68 of the case ring 26 and is surrounded by a seal 32 secured to the case ring 26 to prevent moisture, debris, or both from entering the casing 22. While a single drive shaft 48 is shown, it is envisioned that the motor 20 may also be configured to have a pair (or more) drive shafts 48 extending out of the casing 22, thereby facilitating the motor 20 driving one or more eternal components, such as rotors of a boat. The seal 32 may also prevent lubricant, moisture, or both from exiting the casing 22. The drive shaft 48 extends through a bearing block 50 secured within a cutout of a stator 30. The motor 20 further includes rotors 28 on opposing sides of the stator 30 that may rotate in opposing directions ($D_1$ and $D_2$, respectively) around a motor shaft 56 via a plurality of motor shaft bearings 60 spaced apart by washers 62 and a spacer 58. The rotors 28 rotate so that ring gears 40 on the rotors 28 engage a pinion gear 66 of the drive shaft 48 and translate a rotational movement of the rotors 28 substantially orthogonally to rotate the drive shaft 48 in a rotational direction ($R_1$). It is contemplated that the rotors 28 and the drive shaft 48 may also be rotated in an opposite direction as the one illustrated. The drive shaft 48 may be configured to rotate within the bearing block 50 by a plurality of drive shaft bearings 54 secured around the drive shaft 48 by a plurality of locking collars 52. The drive shaft bearings 54 may include axial bearings 54A, thrust bearings 54B, or both.

Figure 4:
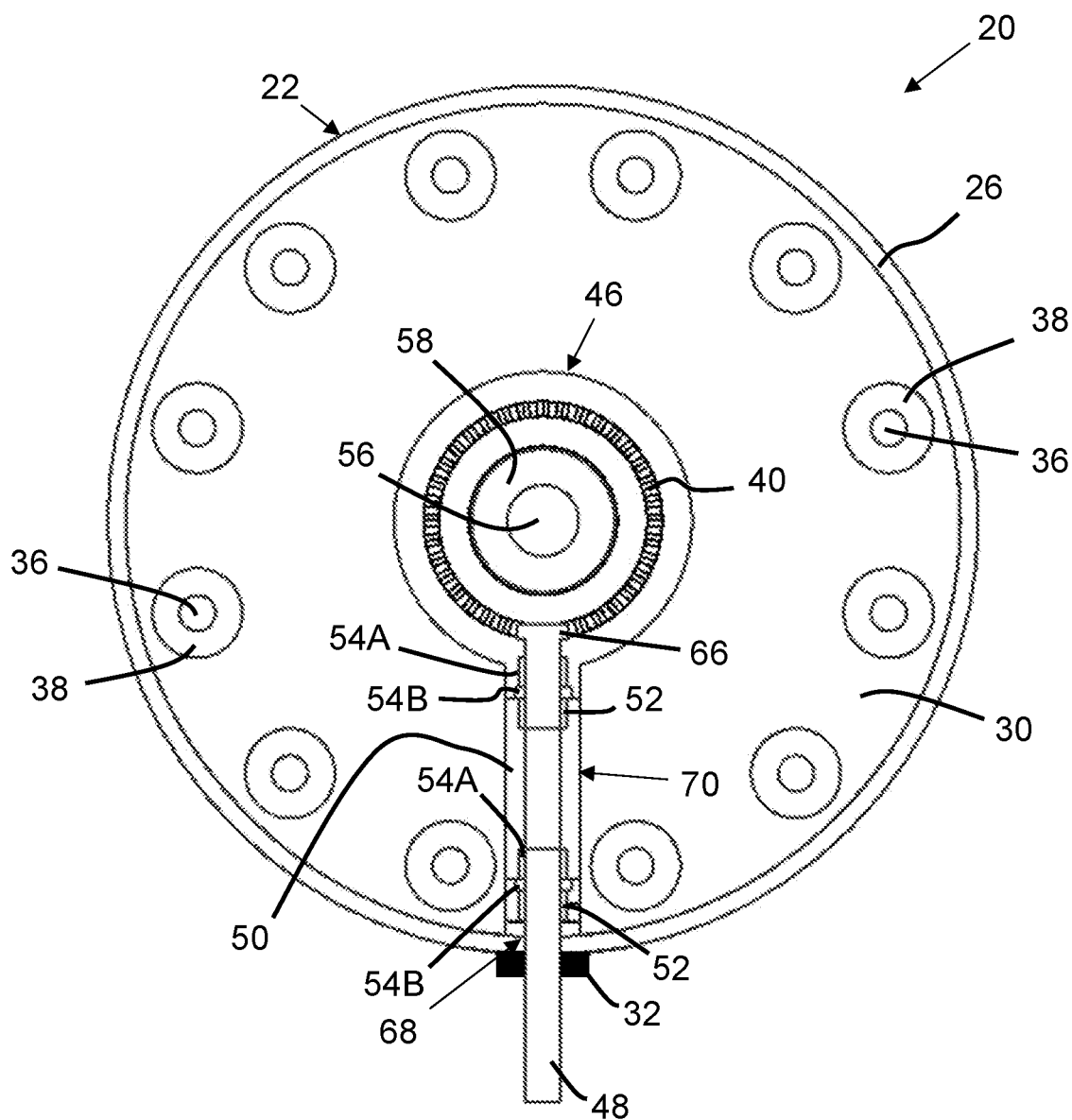
FIG. 4 is cross-section 4-4 of FIG. 2.

FIG. 4 is cross-section 4-4 of the motor 20 of FIG. 2. The motor 20 includes a casing 22. The casing 22 includes a case ring 26 and two opposing case disks secured to opposing ends of the case ring 26 (see FIG. 2). A drive shaft 48 extends out of a drive shaft hole 68 of the case ring 26 and is surrounded by a seal 32 secured to the case ring 26 to prevent moisture, debris, or both from entering the casing 22. The seal 32 may also prevent lubricant, moisture, or both from exiting the casing 22. The drive shaft 48 extends through a bearing block 50 secured within a cutout 70 of a stator 30. The stator 30 includes a plurality of cores 36 surrounded by windings 38 distributed around a periphery of the stator 30. A pair of rotors (not shown) located on opposing sides of the stator 30 rotate about a motor shaft 56 via a plurality of motor shaft bearings (not shown) spaced apart by a spacer 58 located within an aperture 46 of the stator 30. The rotors may rotate based on electrical excitation of the windings 38 so that ring gears 40 of the rotors engage a pinion gear 66 of the drive shaft 48 and translate a rotational movement of the rotors substantially orthogonally to rotate the drive shaft 48. The drive shaft 48 may be configured to rotate within the bearing block 50 by a plurality of drive shaft bearings 54 secured around the drive shaft 48 by a plurality of locking collars 52. The drive shaft bearings 54 may include axial bearings 54A, thrust bearings 54B, or both.

Figure 5:
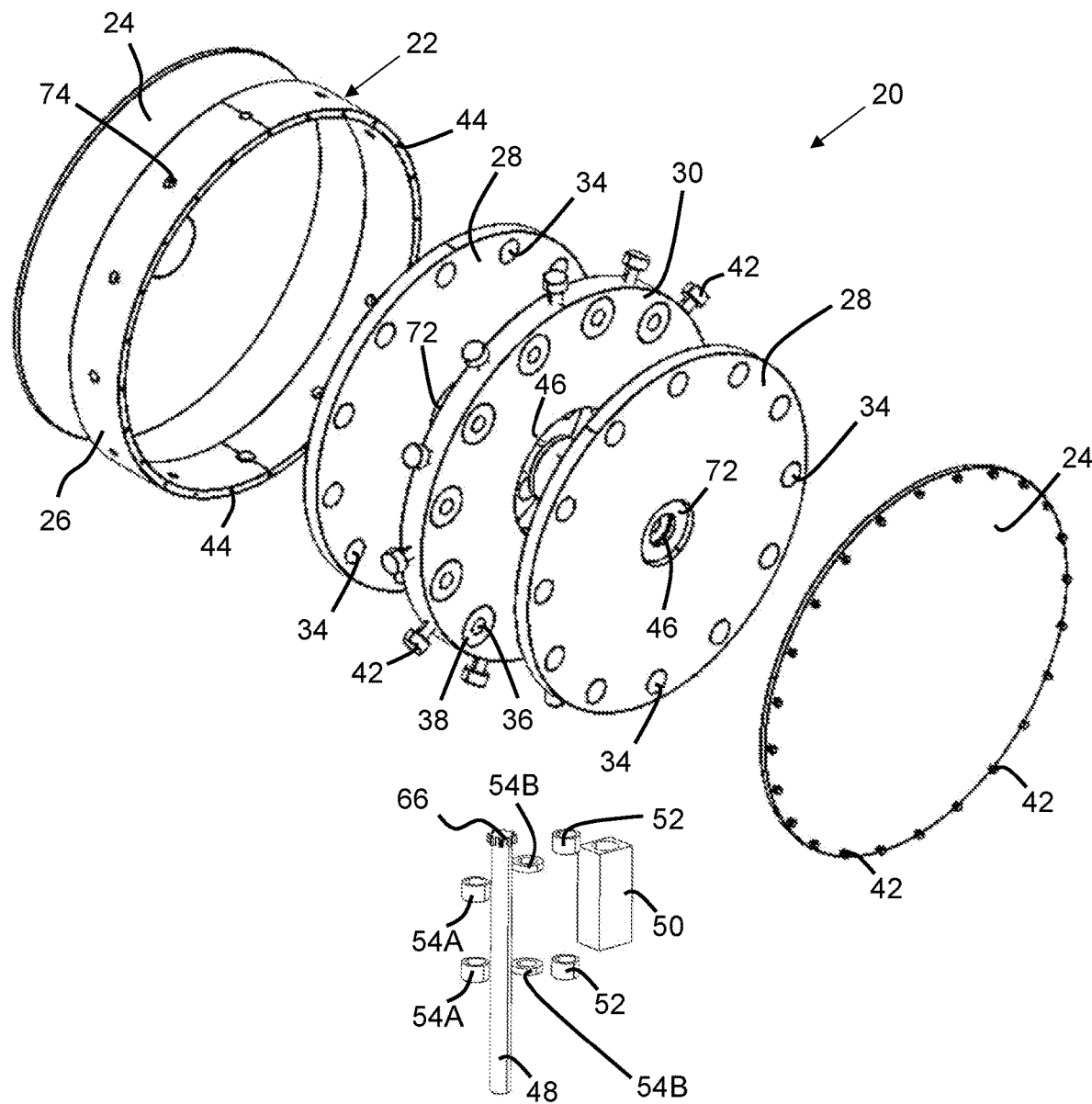
FIG. 5 is an exploded view of a motor in accordance with the present teachings.

FIG. 5 illustrates an exploded view of a motor 20. The motor 20 includes a casing 22. The casing 22 includes a case ring 26 and two opposing case disks 24 secured to opposing ends of the case ring 26 by a plurality of fasteners 42 that extend through the case disks 24 and into mounting holes 44 of the case ring 26. A stator 30 is secured within the casing 22 by a plurality of fasteners 42 that extend through through-holes 74 of the case ring 26 and into the stator 30. A pair of rotors 28 are positioned near opposing sides of the stator 30. Each rotor 28 includes a plurality of magnets 34 and a ring gear (not shown) positioned within a recess 72 of the rotor 28. As illustrated, the rotors 28 may include a recess 72 on one or both faces. For example, the rotors 28 may include a recess 72 on a side that abuts the stator 30, an opposing side of the rotors 28, or both. It is contemplated that the recesses 72 of the rotors 28 may receive one or more bearings, a ring gear, or both. The rotors 28 may rotate in opposing directions around a motor shaft extending through apertures 46 of the stator 30 and the rotors 28. The rotors 28 rotate so that the ring gears engage a pinion gear 66 of a drive shaft 48 and translate a rotational movement of the rotors 28 substantially orthogonally to rotate the drive shaft 48. The rotors 28 may rotate based on electrical excitation of windings 38 of the stator 30 that coil around a plurality of cores 36. It should be noted that the windings 38 may be a continuous winding 38 that extends around the plurality of cores 36 (see FIG. 10). The drive shaft 48 may be configured to rotate within a bearing block 50 by a plurality of drive shaft bearings 54 secured around the drive shaft 58 by a plurality of locking collars 52. The drive shaft bearings 54 may include axial bearings 54A, thrust bearings 54B, or both.

Figure 6:
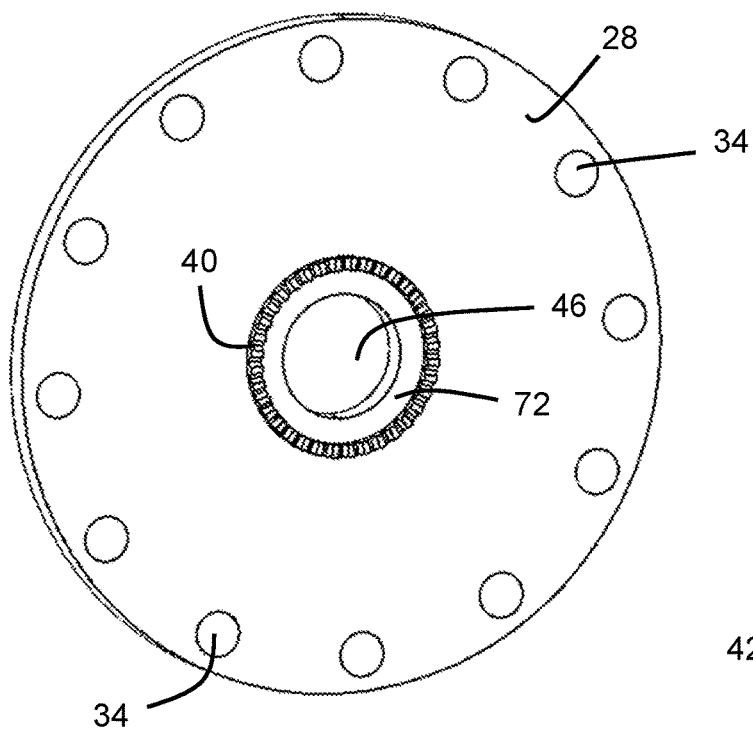
FIG. 6 is a side view of a rotor.

FIG. 6 illustrates a side view of a rotor 28. The rotor 28 includes a plurality of magnets 34 positioned around a periphery of the rotor 28. The rotor 28 further includes a ring gear 40 positioned within a recess 72 of the rotor 28, whereby the ring gear 40 substantially surrounds an aperture 46 of the rotor 28.

Figure 7:
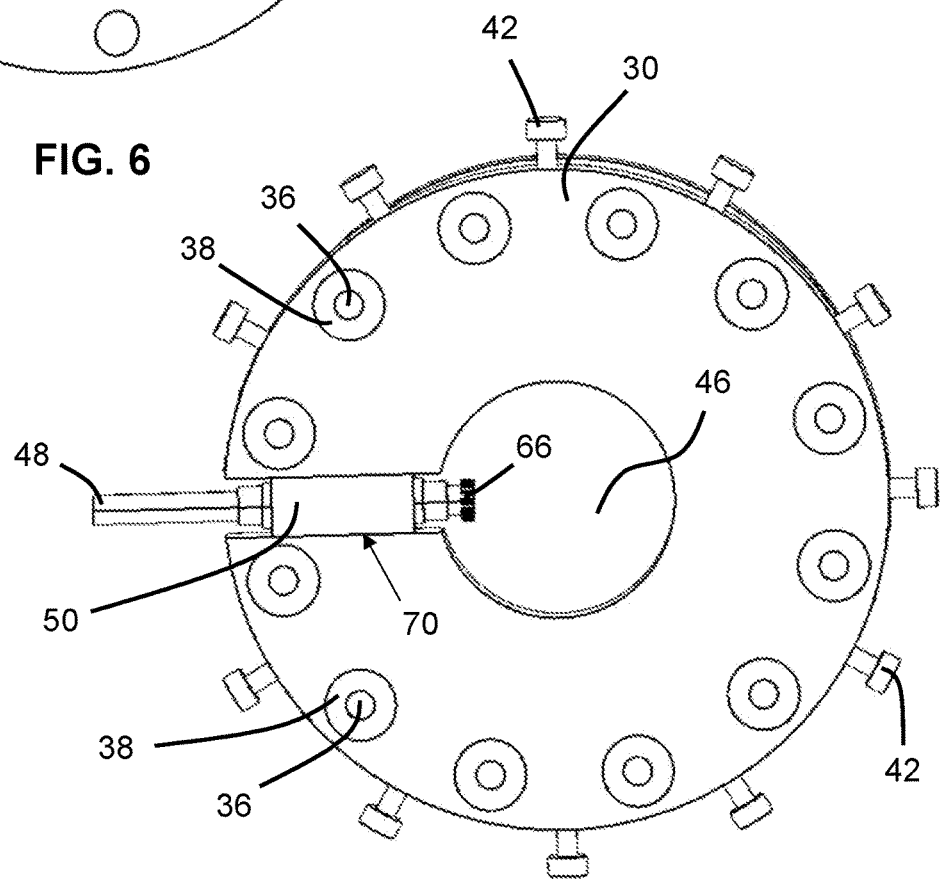
FIG. 7 is a side view of a stator connected to a drive shaft.

FIG. 7 illustrates a side view of a stator 30. The stator 30 includes a plurality of cores 36 surrounded by windings 38 positioned around a periphery of the stator 30. It should be noted that the windings 38 may be a continuous winding 38 that extends around the plurality of cores 36 (see FIG. 10). A drive shaft 48 of the motor extends into a cutout 70 of the stator 30 and is secured within the cutout 70 by a bearing block 50. A pinion gear 66 of the drive shaft 48 is positioned within an aperture 46 of the stator 30 to engage one or more ring gears of one or more rotors (see FIGS. 1-6). As illustrated, the stator 30 may be secured within a casing (not shown) by a plurality of fasteners 42 that extend through the casing and into the stator 30.

Figure 8:
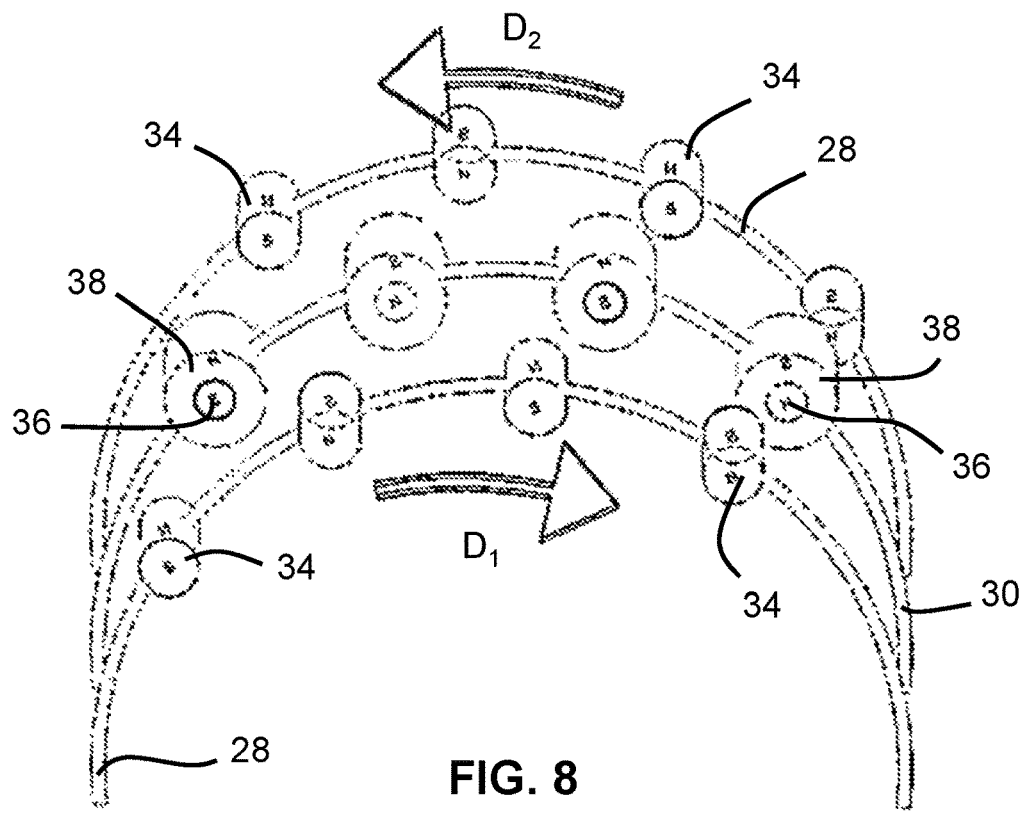
FIG. 8 is an exemplary arrangement of a plurality of rotors relative to a stator of a motor in accordance with the present teachings.
Figure 9:
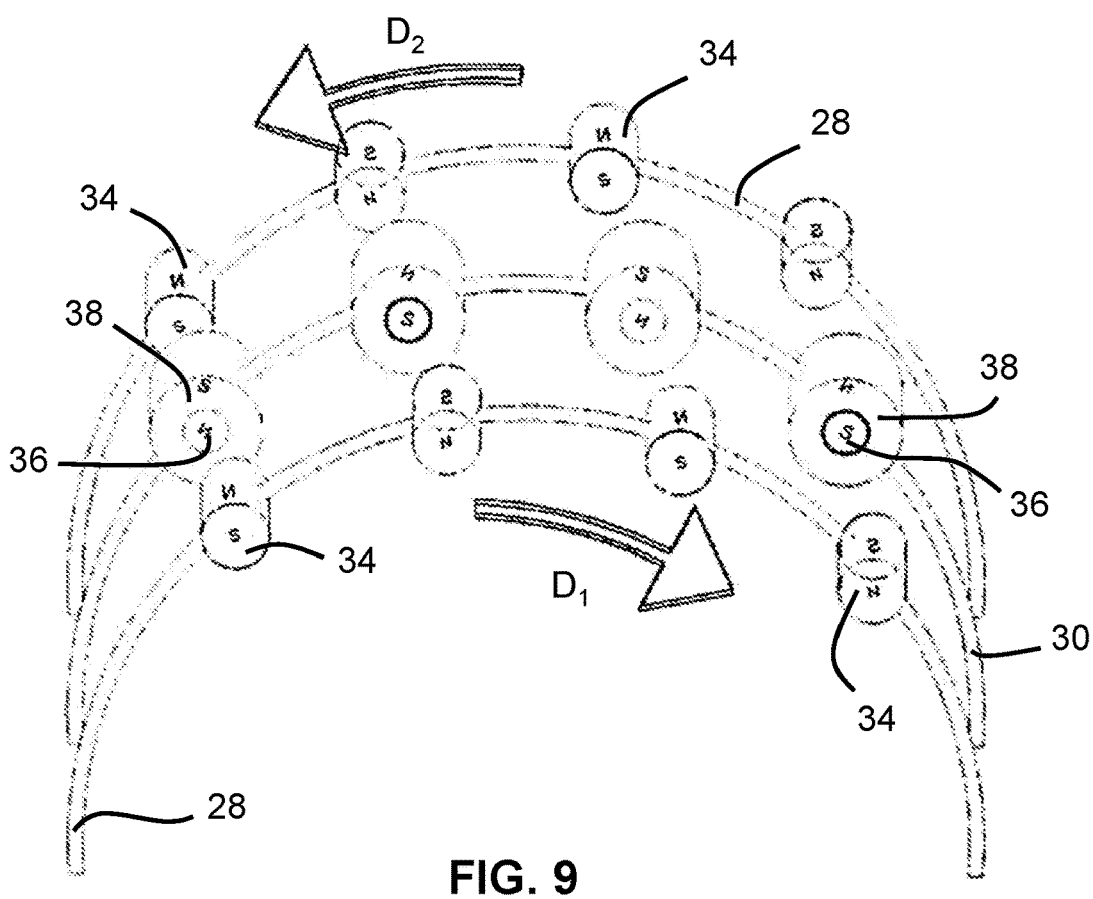
FIG. 9 is an exemplary arrangement of a plurality of rotors relative to a stator of a motor in accordance with the present teachings.

FIGS. 8 and 9 illustrate exemplary arrangements of a plurality of rotors 28 relative to a stator 30 of a motor. For clarity, the structure of the rotors 28 and the stator 30 have been omitted. As illustrated, the rotors include a plurality of magnets 34 having alternating polarity (i.e., N or S). The stator 30 includes a plurality of cores 36 surround by windings 38, whereby a polarity of each core 36 is determined by a direction of the windings 38 around each core 36 (see FIG. 10). It should be noted that the windings 38 may be a continuous winding 38 that extends around the plurality of cores 36 (see FIG. 10). As shown, when the windings 38 are electrically charged, the rotors 28 move in opposing directions ($D_1$ and $D_2$) based on an axial flux created between the stator 30 and the rotors 28 so that the rotors drive a drive shaft of the motor (see FIGS. 3 and 4).

Figure 10:
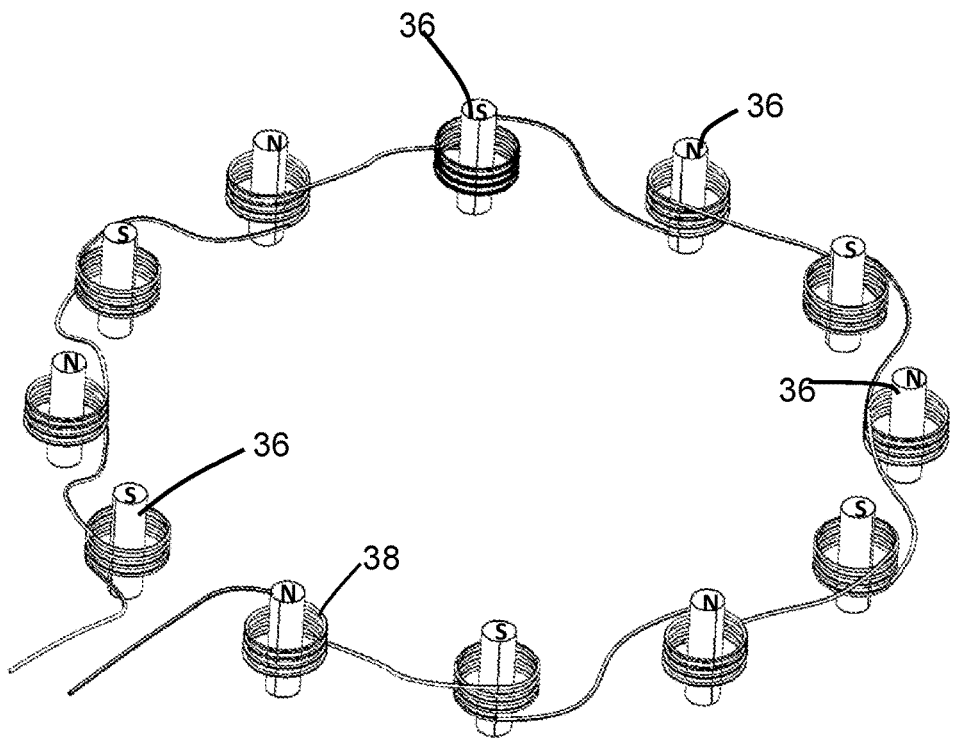
FIG. 10 is an exemplary coil winding arrangement of stator of a motor in accordance with the present teachings.

FIG. 10 illustrates a winding arrangement of a stator of a motor. The structure of the stator has been omitted for clarity. The stator includes a plurality of cores 36 having alternating polarity (i.e., N or S). A continuous winding 38 is wrapped around each of the cores 36. The polarity of the winding 38 around each of the plurality of cores 36 is dictated by wrapping the winding 38 in a clockwise direction or a counterclockwise direction.

Figure 11:
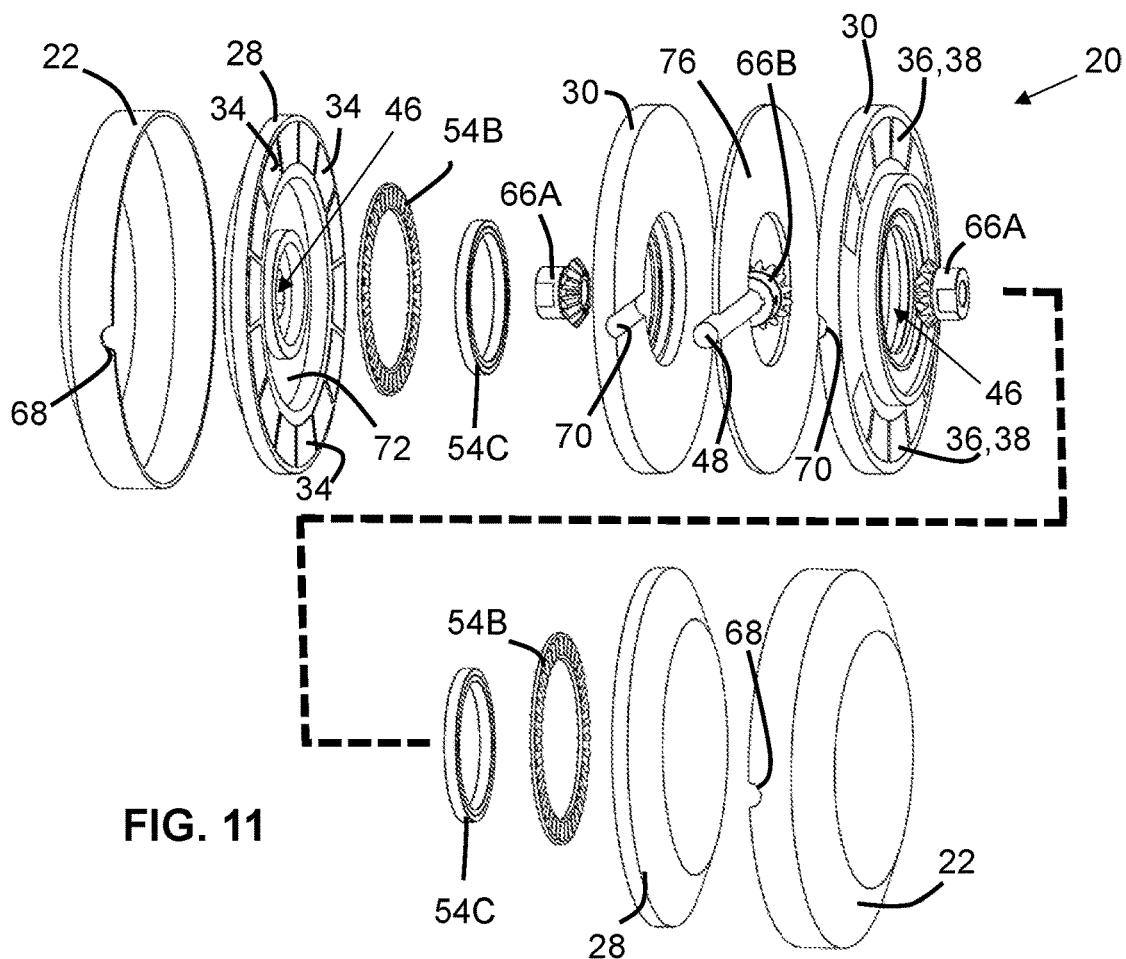
FIG. 11 is an exploded view of a motor having dual rotors and dual stators in accordance with the present teachings.

FIG. 11 illustrates an exploded view of a motor 20. The motor 20 may operate similar to the motor shown in FIG. 5. However, the motor may include a pair of rotors 28 and a pair of stators 30 instead of a dual rotor 28, single stator 30 configuration. Thus, it may be gleaned from the present teachings that the motor 20 as described herein may beneficially allow for multiple configurations to tune the motor 20 based on a desired application. For example, a dual rotor 28, dual stator 30 configuration may beneficially increase output along the drive shaft 48 to operate an external component, such as a rotor of a boat.

As shown in FIG. 11, the motor 20 includes opposing portions of a casing 22 that form a clamshell-like housing around the motor 20. The motor 20 includes a pair of rotors 28 positioned on opposing sides of the drive shaft 48. The rotors 28 may each include a plurality of windings 38 around associated cores 36 as described above that, once electrically excited, may interact with adjacent rotors 28. For example, a pair of rotors 28 may abut the stators 30 so that magnets 34 located along the rotors 28 interact with the electrified windings 38 and cores 36 to move the rotors 28. The stators 30 may also be secured to each other via a plate 76 positioned between the stators 30. The plate 76 may be substantially non-magnetic and/or have low magnetic permeability so as to not interfere with the magnetic fields created by the stators 30. The plate 76 may be secured to the stators 30 via one or more fasteners, one or more adhesives, a mechanical interlock, or a combination thereof (not shown).

It is envisioned that the rotors 28 are rotated in opposing directions to drive the motor shaft 48. For example, a first rotor 28 may rotate in a clockwise direction while a second rotor 28 may rotate in a counterclockwise direction, or vice versa so that rotor pinion gears 66A keyed into apertures 46 of the rotors 28 engages a drive shaft pinion gear 66A, thereby rotating the drive shaft 48 (see, e.g., FIG. 3). The rotation of the rotors 28 and/or positioning of the rotors 28 relative to the stators 30 may be faciliated by thrust bearings 54B and radial bearing 54C positioned between the rotors 28 and the stators 30. Additionally, to drive an external device, the drive shaft 48 may extend through cutouts 70 along the stators 30 and out of a drive shaft hole 68 formed between the pieces of the casing 22. However, it should be noted that the drive shaft 48 may extend in any manner outside of the casing 22 to engage an external device.

Figure 12A:
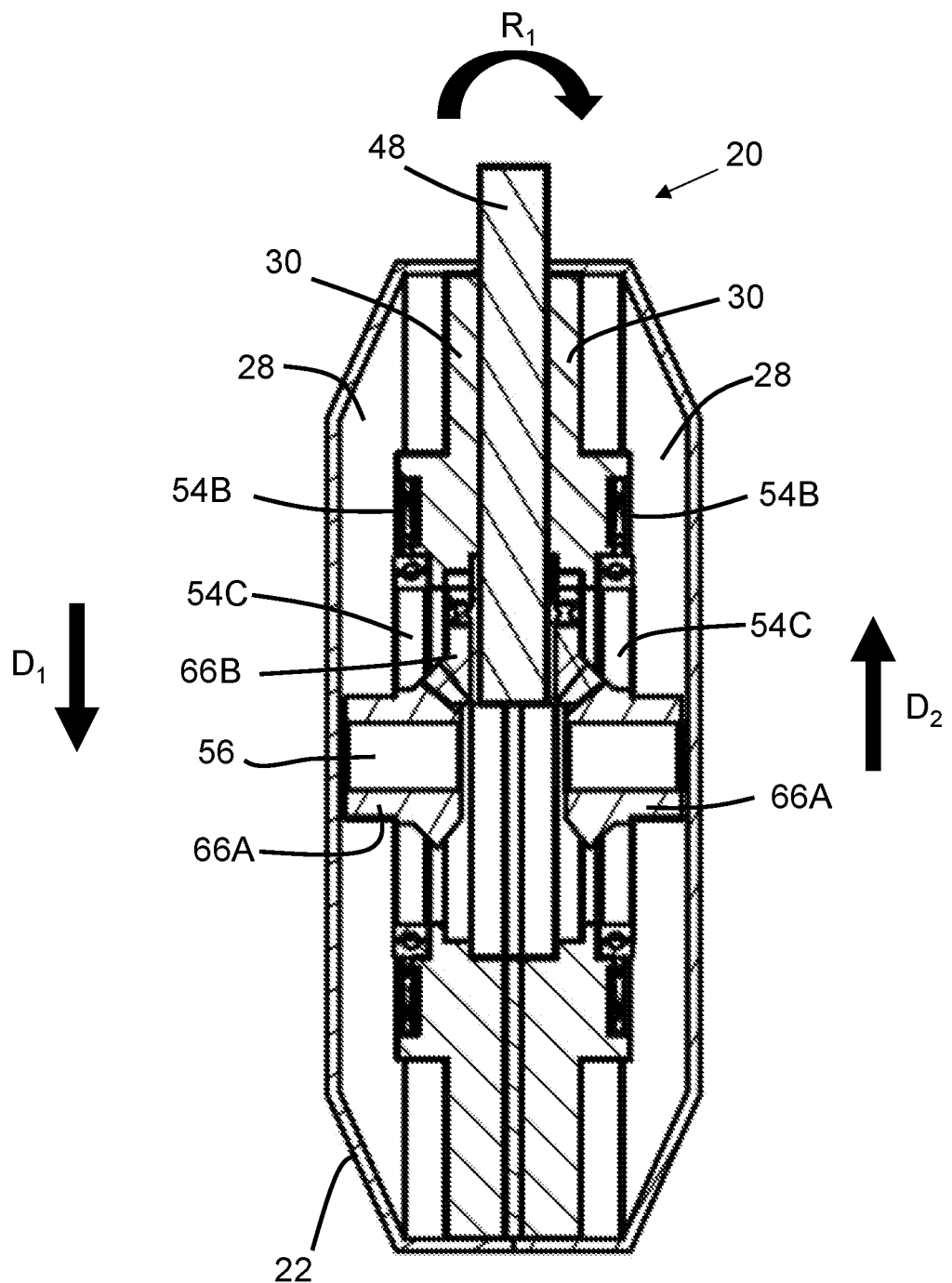
FIG. 12A is a cross-section of a motor having dual rotors and dual stators in accordance with the present teachings.
Figure 12B:
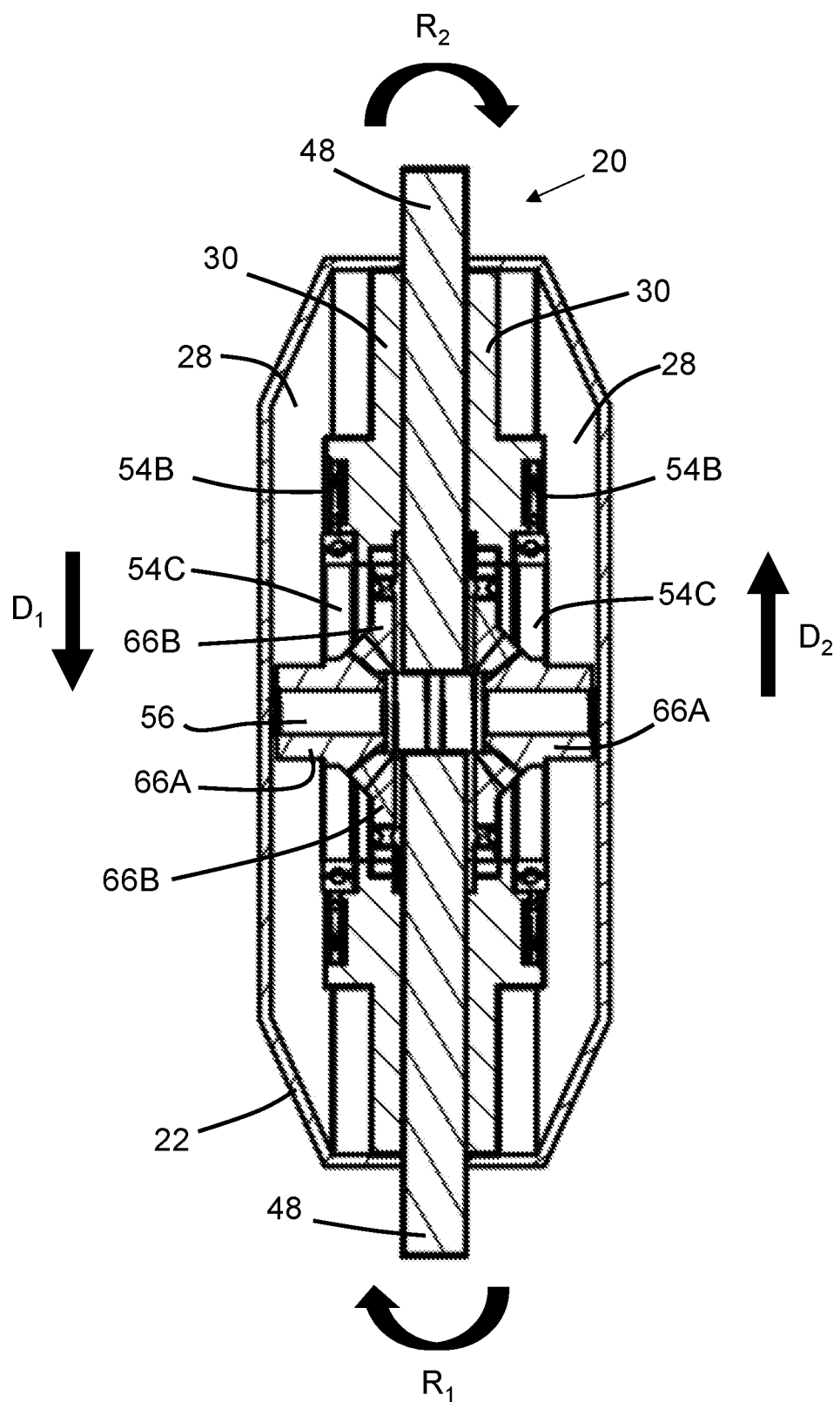
FIG. 12B is a cross-section of a motor having opposing drive shafts.

FIGS. 12A and 12B illustrate exemplary cross-sections similar to the motor 20 shown in FIG. 11. As shown in FIG. 12A, the motor 20 may include stators 30 positioned on opposing sides of a drive shaft 48 extending from a central portion of the motor 20 through an exterior casing 22. A pair of rotors 28 abut the stators 30 and communicate with the stators in a substantially contactless manner (see FIG. 11) to move the rotors 28 in opposing rotational directions ($D_1$, $D_2$) to drive the drive shaft 48. However, it is also envisioned that the motor 20 may be configured to allow the rotors 28 to rotate in the same rotational direction to drive the drive shaft 48. The rotation of the rotors 28 and/or positioning of the rotors 28 relative to the stators 30 may be facilitated by thrust bearings 54B and radial bearing 54C positioned between the rotors 28 and the stators 30.

Each rotor 28 may include a rotor pinion gear 66A keyed within an aperture of the rotors 28 so that rotation of the rotors 28 also rotates the rotor pinion gears 66A. As the rotor pinion gears 66A rotate they engage a drive shaft pinion gear 66B, thereby rotating the drive shaft 48 in direction ($R_1$).

FIG. 12B illustrates a motor 20 similar to the motor 20 shown in FIG. 12A except for the motor 20 having a pair of drive shafts 48 extending in opposing directions through the casing 22. As discussed above, the rotors 28 may rotate in opposing directions ($D_1$, $D_2$), thereby engaging a pair of drive shaft pinion gears 66B connected to each of the drive shafts 48. Thus, as the rotors 28 rotate, each of the drive shafts 48 is also rotated in a rotation direction ($R_1$, $R_2$). The rotational directions ($R_1$, R2) may be in opposing rotational directions (i.e., a first drive shaft 48 rotates clockwise while a second drive shaft 48 rotates counterclockwise). As such, the rotors 28 may beneficially translate a rotational movement from the rotors 28 substantially orthogonally into a rotational movement of the drive shafts 48.

ELEMENT LIST

20 Motor
22 Casing
24 Case Disk
26 Case Ring
28 Rotor
30 Stator
32 Seal
34 Magnet
36 Core
38 Winding
40 Ring Gear
42 Fastener
44 Mounting Hole
46 Aperture
48 Drive Shaft
50 Bearing Block
52 Locking Collar
54 Drive Shaft Bearing
54A Axial Bearing
54B Thrust Bearing
54C Radial Bearing
56 Motor Shaft
58 Spacer
60 Motor Shaft Bearing
62 Washer
66 Pinion Gear
66A Rotor Pinion Gear
66B Drive Shaft Pinion Gear
68 Drive Shaft Hole
70 Cutout
72 Recess
74 Through-Hole
76 Plate
$D_1$ Direction of Rotation of the Rotor
$D_2$ Direction of Rotation of the Rotor
$R_1$ Direction of Rotation of the Drive Shaft
$R_2$ Direction of Rotation of the Drive Shaft Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements, ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A motor comprising:
   (a) a stator having a plurality of ferrous cores surrounded by a plurality of windings;
   (b) a pair of rotors positioned on opposing sides of the stator, each rotor including a ring gear; and
   (c) a drive shaft extending through a cutout of the stator, the drive shaft having a pinion gear positioned near an end of the drive shaft in communication with the ring gears of the rotors;
   wherein the rotors rotate in opposing directions so that the ring gears translate a movement of the rotors to the drive shaft through the pinion gear to rotate the drive shaft in a direction substantially orthogonal to a direction of rotation of the rotors.

2. The motor of claim 1, wherein the plurality of ferrous cores are positioned along a periphery of the stator and the plurality of windings determine a polarity of each ferrous core the plurality of windings is wound upon.

3. The motor of claim 1, wherein the plurality of windings is a continuous line that wraps around all of the plurality of ferrous cores.

4. The motor of claim 1, wherein the pair of rotors each include a plurality of magnets so that, when electricity flows through the plurality of windings, an axial flux extending between the pair of rotors and the stator initiates rotation of the pair of rotors.

5. The motor of claim 1, wherein the ring gears are positioned within a recess of each of the rotors and surround an aperture of the rotor.

6. The motor of claim 1, wherein the drive shaft extends through a cutout of the stator so that the pinion gear is positioned within an aperture of the stator to communicate with the ring gears of the rotors.

7. The motor of claim 6, wherein the drive shaft is secured within the cutout by a bearing block, and the drive shaft rotates within the bearing block by a plurality of bearings secured around the drive shaft and secured by a plurality of locking collars.

8. The motor of claim 1, wherein the stator and the pair of rotors are housed within a casing, and the drive shaft extends through a hole of the casing to communicate with the stator and the pair of rotors.

9. The motor of claim 8, wherein a seal surrounds the drive shaft extending through the casing to prevent moisture, debris, or both from entering the casing, oil from exiting the casing, or a combination thereof.

10. The motor of claim 1, wherein the pair of rotors rotate about a motor shaft extending through apertures of the pair of rotors and the stator.

11. The motor of claim 10, wherein the pair of rotors rotate about the motor shaft via a plurality of bearings spaced apart by one or more washers, a spacer, or both.

12. The motor of claim 8, wherein the casing is disk-shaped.

13. The motor of claim 1, wherein the motor is a boat motor.

14. The motor of claim 1, wherein the ring gears of the rotors sandwich the pinion gear of the drive shaft.

15. The motor of claim 1, wherein the motor is configured to fully operate when fully submerged in water.

16. The motor of claim 1, wherein the stator remains stationary during operation of the motor.

17. The motor of claim 6, wherein the ring gears extend into the aperture of the stator to engage the pinion gear so that the pair of rotors and the stator are substantially coaxial.

18. The motor of claim 4, wherein the magnets of each rotor alternate in polarity.

19. The motor of claim 8, wherein the stator is secured to a casing ring of the casing by a plurality of fasteners extending through through-holes of the casing ring into the stator.

20. The motor of claim 2, wherein the polarity of the plurality of windings around each core is dictated by winding each of the plurality of windings in a clockwise or a counterclockwise direction.

* * * * *